United States Patent [19]
Gournelle

[11] 3,800,682
[45] Apr. 2, 1974

[54] APPARATUS FOR MAKING CONTAINERS OF THERMOPLASTIC SHEET MATERIAL

[76] Inventor: Maurice Paul Gournelle, 1 rue des Bruyeres, Asnieres, Hauts de Seine, France

[22] Filed: Sept. 8, 1971

[21] Appl. No.: 178,756

[30] Foreign Application Priority Data
Sept. 8, 1970   France .......................... 70.32547

[52] U.S. Cl. ............................................ 93/59 MT
[51] Int. Cl. ............................................ B31b 1/28
[58] Field of Search ........ 93/36 R, 36 MM, 59 MT, 93/59 CE, 59 R

[56] References Cited
UNITED STATES PATENTS
2,583,641   1/1952   Gaubert et al. .................. 93/59 MT
1,220,517   3/1917   Kondolf ........................... 93/59 MT
3,422,730   1/1969   Mitzelfelt ...................... 93/59 MT X
3,593,623   7/1071   Oakley ........................... 93/59 MT X
3,538,595   11/1970  Barnes ............................. 93/59 MT Primary Examiner—Andrew R. Juhasz
Assistant Examiner—Leon Gilden
Attorney, Agent, or Firm—Karl F. Ross; Herbert Dubno

[57] ABSTRACT

In making a container with a motif in its surface a sheet of thermoplastic material, printed with a predistorted motif, is heated and held by clamps. The heated thermoplastic material is then forced into a die by a punch provided with a resiliently biased, normally projecting stem which is repressed into the punch upon contacting (through the sheet) the closed end of the die.

20 Claims, 5 Drawing Figures

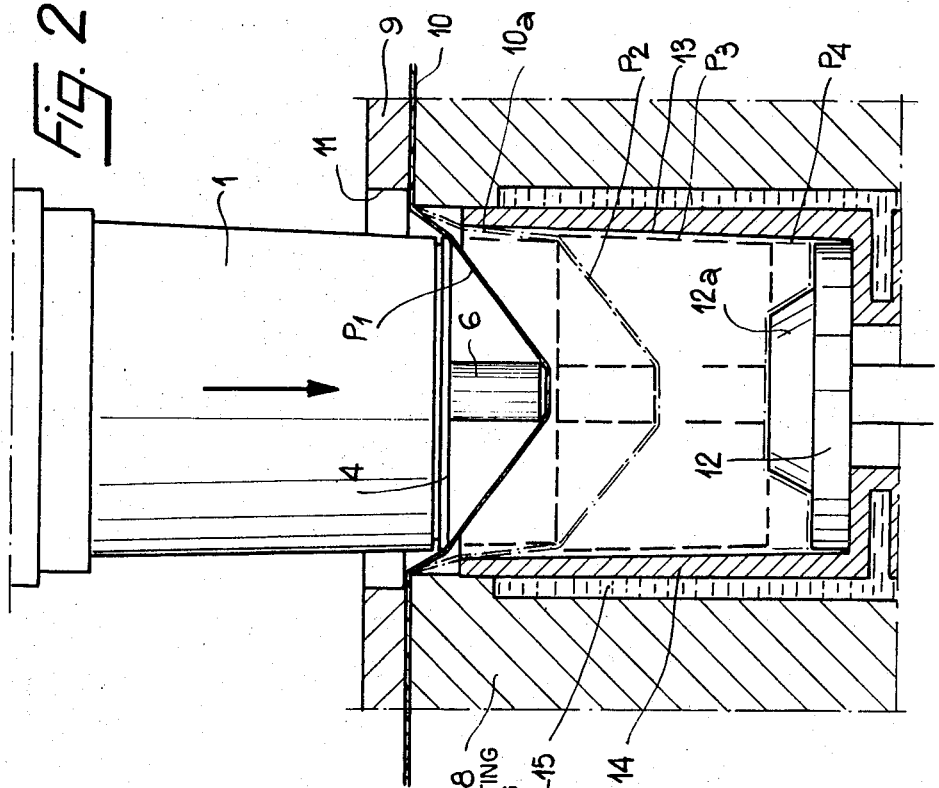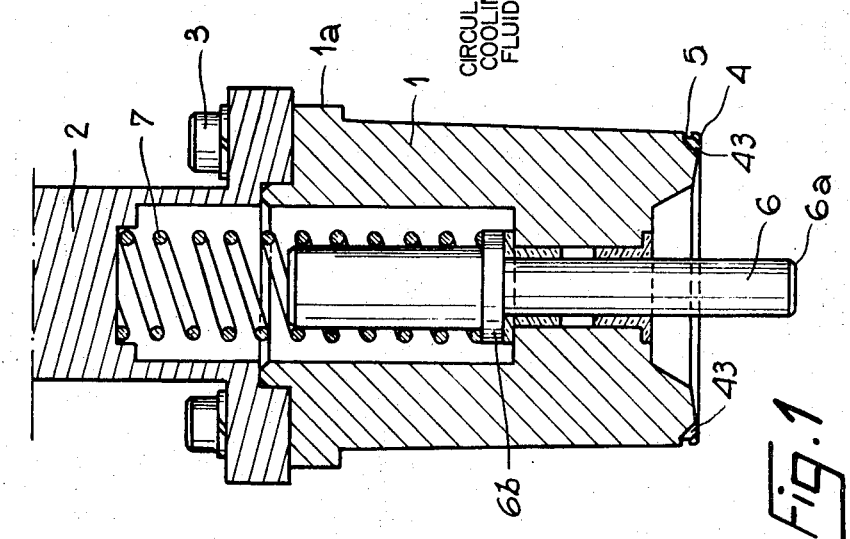

APPARATUS FOR MAKING CONTAINERS OF THERMOPLASTIC SHEET MATERIAL

This invention relates to apparatus for manufacturing containers from sheets of thermoplastic material, the containers bearing motifs such as words or designs.

The procedure usually followed to transfer such motifs onto containers is to print on the finished containers. Such a step is obviously very costly because the printing machines must be adapted to the shape of the containers. Moreover, the containers must be presented to and removed from the printing machine one by one.

It has been previously proposed to make containers from sheets of thermoplastic materials, such as polyvinyl chloride, polystyrene or polyethylene, by forming with dies.

The method most frequently employed is to vacuum form the container, with or without the assistance of a plug. Such methods tend to stretch the sheets in an irregular manner. For example, a slight local difference in thickness or temperature of the sheet may cause a considerable variation of its extensibility at that location so that an outline, carried on one of the faces of the flat thermoplastic sheet, after stretching will be deformed in a random fashion and may differ from one article to the next. Written messages may be distorted.

According to the present invention, the sheet is printed with a distorted motif and is then held between two clamps whereupon the container is formed with a punch so that the motif appears undistorted on the formed container.

It is possible to select the distorted dimensions of the motifs so that, after stretching in the various directions of the portions of sheets which bear them, the undistorted motifs will have exactly the desired final shapes and dimensions.

In the case of flat-bottomed containers, the part of the sheet which comes into contact with the end of the punch suffers practically no stretching, which gives to the bottom of the container a thickness substantially greater than that of its walls, and limits the stretching to the marginal area of the sheet, making it necessary to concentrate the printed motifs there.

To avoid this, the punch may have a heat-insulated periphery and a member which projects beyond the punch face corresponding to the base, to stretch the center of the sheet, and retracts into the punch during forming.

The relationship between the distorted and the undistorted motif may be determined empirically, experimentally, by calculation or by a computer associated with a tracer.

In order that the color of the printing can be fairly uniform in spite of different amounts of expansion of the sheets in different areas of the motif, the sheet can be printed by using a plate having recesses for the printing medium, the depths of the recesses at different locations being related to the degree of expansion of the areas of the recesses upon forming. Thus, if the printed area is expanded considerably, more of the printing medium is available for keeping the colour from becoming too pale.

In the accompanying drawing;

FIG. 1 shows in cross-section a punch having a resiliently biased axial rod;

FIG. 2 shows diagrammatically the punch of FIG. 1 used for forming a container;

Figure 3:
FIGS. 3 and 4 show diagrammatically a predistorted motif and the same motif normalized upon forming.

FIG. 1 shows a 1 mounted at the end of a punch-holder 2 by screws 3. The punch 1 is generally frusto-conical but has a cylindrical area 1a designed for shaping a cylindrical collar on the container to be formed.

A groove 5 is formed on the tapered peripheral surface of the punch body near the edge 4 of the free end thereof. The groove 5 thermally insulates this edge thermally from the remainder of the punch and keeps it relatively cool. A rod 6 slides within the punch and is prevented from falling out by an annular shoulder 6b. A spring 7 urges the rod toward the free end of the punch so that part of the rod projects beyond the punch. The end face 6a of the normally projecting extremity of the rod 6 may be chromium plated and finely polished or may be coated with a material with strong tendency to adhere to the worked plastic material.

FIG. 2 shows the cooperation of the punch 1 with a die 8 and a hold-down clamp 9 which immobilizes the sheet 10 to be stamped as it overlies the open mouth of the die.

The sheet area defined by the outline of an opening 11 is the clamp 9 having been previously heated in suitable manner, the punch 1 with the projecting rod 6 is moved very quickly, for example at a speed greater than 2 meters per second, toward the sheet 10 in the coaxial openings of the clamp and the die. This high speed is desirable in order to let the deformation of the sheet take place isothermally, i.e., in a state in which the viscosity is constant over the working area of the sheet.

Initially only the rod 6 meets the sheet 10; then the edge 4 of the punch touches it in turn (position $P_1$). However, as the edge 4 is thermally insulated and spaced from the punch body, the sheet 10 may slide in relation to this edge so that the whole sheet continues to be stretched (position $P_2$). When the rod 6 abuts a boss 12a on the die bottom, the air trapped between the sheet and the end of the punch can escape, either along the periphery of the punch so as to facilitate sliding of the sheet, or through perforations 43 in the base of the punch which open into the groove 5. Finally, the boss 12a, which is a part of an ejector 12 inside the die, causes a recess to be formed in the base of the container by repressing the rod 6 into correspondingly recessed bottom end of the the punch. The container periphery comes into contact with a wall 13 of the die, of a liner 14 which receives the inserted punch 1 with clearance and defines a space 15 for the circulation of a cooling fluid between the liner and the surrounding shell. Since the prestretching of the sheet by the projecting rod 6 has provided a reserve of sheet material sufficient to conform to the recessed punch bottom, the sheet contacts the die without sliding over the wall 13 and solidifies by virtue of this contact.

Motifs previously printed on the sheet in the area which corresponds to the portion 10a are expanded by the stretching of this portion; moreover they are not destroyed by friction between the sheet and the walls of the die but are "fixed" by solidification of the thermoplastic sheet.

Figure 4:
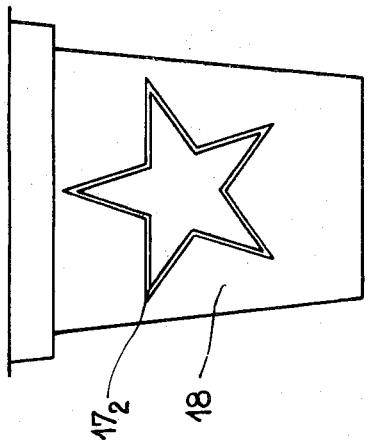

FIG. 3 shows the contracted motif 17₁ as it was printed on the flat area 10a and FIG. 4 shows the normalized motif 17₂ obtained on the wall of a cup 18 after it has been formed.

Obviously it is possible to increase the length of that part of the rod 6 which projects beyond punch. In the an extreme case, this length may be such that the end face 6a touches the bottom of the die (boss 12a) just at the moment when the edge 4 meets the thermoplastic sheet. It is clear that the use of a rod coaxial with the punch is suitable for forming any container which are centered on an axis. For containers of oval or other noncircular cross-section it is possible to use at least two rods spaced in the direction of the length of the die or to use punches which container plates instead of the rods 6.

Figure 5:
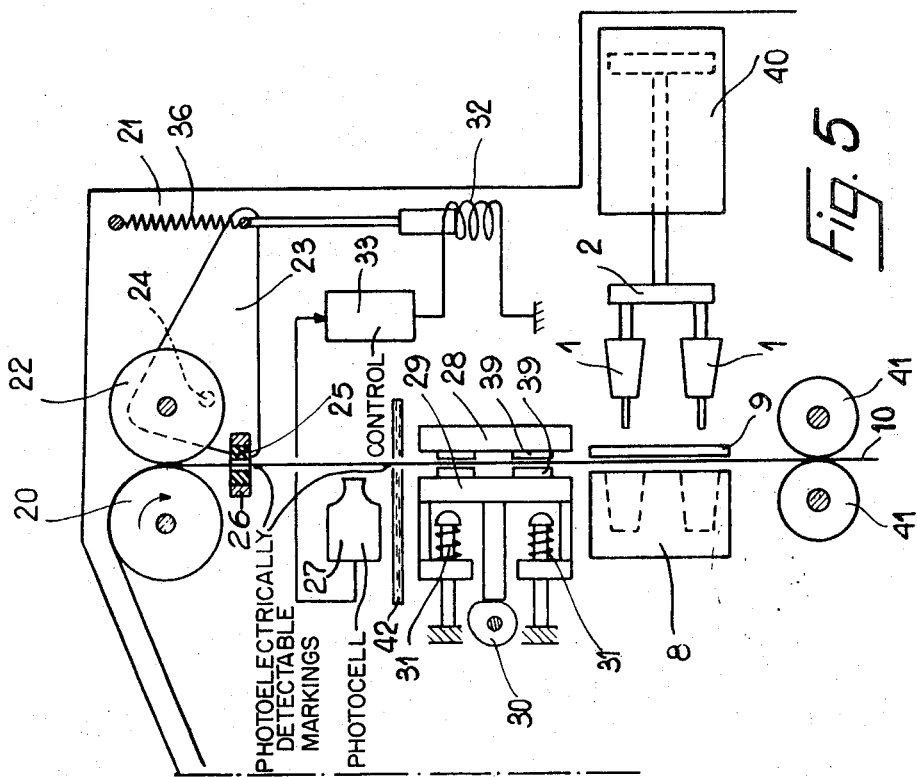
FIG. 5 is a diagrammatic view of a forming machine.

FIG. 5 shows diagrammatically a device for accurately positioning a tape 10 or ribbon of plastic material having contracted motifs in an apparatus for forming containers.

The tape 10 comes from a reel (not shown) and passes between a drive roller 20, rotatably mounted in a machine frame 21, and a coacting roller 22 carried by a lever 23 composed of two triangular members which swing about a pivot pin 24. The lever 23 is urged in a counterclockwise direction by a spring 36 and carries a brake shoe 25 of a width equal to that of the tape. A cooperating brake shoe is carried by a supporting block 26.

After having passed between the brake shoes the tape passes in front of a photoelectric cell 27 and between heating electrodes, one of which, 28, is fixed while the other, 29, is movable toward and away from the electrode 28, its movement being controlled by a cam 30 and springs 31.

The tape 10 is then engaged between the clamp 9 and the die 8 in order to receive the punch or punches 1 advanced by a ram 40 which is able to move them at the desired speed.

The lever 23 is operated by an a solenoid 32 which receives the signals from the photoelectric sensor 27 through a control unit 33. Finally, for safety's sake, a screen 42 suitably cooled by a cooling fluid is placed between the cell 27 and the heating electrodes 28, 29.

The edges of the tape are precisely guided in the space corresponding to the electrodes and to the shaping tool. The tape carries, in addition to the contracted motifs and with the same spacing as the motifs (or group of motifs), marks disposed along a longitudinal strip portion of the ribbon free from motifs which is trapped between the clamp 9 and the die 8. When such a mark appears in front of the cell 27, the solenoid 32 is excited so that, on the one hand, the feed roller 22 ceases to apply the tape against the driving roller, while on the other hand the brake shoe 25 presses the tape against the companion brake shoe carried by the block 26. The roles of the spring 36 and of the solenoid 32 may, if desired, be reversed.

The braking inertia thus being minimal, the immobilization of the tape is practically instantaneous so that the contracted motifs are then exactly situated in the appropriate areas of the dies. Indeed, if the solenoid 32 is energized of mains frequency, the response is obtained within a period at most equal to one one-hundredth of a second. If need be, it is possible to obtain an even quicker response, either with direct current operating by condenser discharge, or with a frequency which is a multiple of the mains frequency.

The cell 27 is advantageously adjustable along the length of the tape 10 to permit it to compensate for any slipping of the tape which may occur.

It will be observed that the relatively reciprocable, jaw-like heating electrodes 28, 29, disposed upstream of die 8 along the guidepath of ribbon 10, help assert the tape during stamping of a downstream portion at the same time as they heat an upstream portion of the ribbon destined to be stamped at the next step. These electrodes may act transversally throughout the extent of the tape; preferably, however the heating action is limited by heat-conducting bosses 39 to surfaces which correspond substantially to the clamp openings 11, their effective areas being thus of the same size as the die mouth so that the remainder of the tape is not heated and preserves its strength.

Complementary tension rollers 41 may act upon the tape after the perforation thereof (i.e., the detachment of the shaped portions) to keep the tape stretched. For this purpose, in a manner known per se, the rollers 41 are frictionally driven with a slip such as to impart to the tape 10 a speed slightly greater than that which is communicated to it by rollers 20 and 22.

The invention applies to the manufacture of pots, goblets, or containers for the packaging of milk products, all provided with inscriptions or decorative motifs.

What I claim as my invention and desire to secure by Letters Patent is:

1. An apparatus for forming containers with imprinted motifs from thermoplastic sheet material, comprising:

a die conforming to the shape of a container to be produced, said die being provided with cooling means for chilling the surface thereof;

a punch receivable in said die, said punch being provided with at least one resiliently loaded member having an extremity normally projecting from a free end of said punch toward said die, said extremity being narrower than said free end and entirely receivable therein;

retaining means adjacent a mouth of said die for holding a thermoplastic sheet in position across said mouth, said sheet having at least one limited area imprinted with a predistorted motif;

heating means positioned to thermally soften a portion of said sheet registering with said mouth; and actuating means for inserting said punch into said die with interposition of the thermally softened sheet portion to deform same into the shape of the die, and with stretching by said extremity of said area to normalize the predistorted motif thereon prior to contact thereof with the chilled die surface, said die having a closed end repressing the projecting extremity of said member into said punch upon complete insertion of the punch into the die.

2. An apparatus as defined in claim 1 wherein said free end is provided with a recess surrounding said projecting extremity.

3. An apparatus as defined in claim 1 wherein said punch has a body provided near said free end with a peripheral edge thermally insulated from the remainder of said body.

4. An apparatus as defined in claim 3 wherein said body is provided with a peripheral groove thermally insulating said edge from said remainder.

5. An apparatus as defined in claim 3 wherein said body tapers toward said peripheral edge.

6. An apparatus as defined in claim 1 wherein said punch has a body centered on an axis, said member extending along said axis.

7. An apparatus as defined in claim 1, wherein said die has a shell and a liner in said shell forming said peripheral wall, said liner being separated from said shell by an intervening space, said cooling means including a source of circulating fluid communicating with said space.

8. An apparatus as defined in claim 1 wherein said actuating means comprises a pusher with a punch-insertion speed high enough to deform said sheet portion substantially isothermally between said punch and said die.

9. An apparatus as defined in claim 8 wherein said punch-insertion speed is greater than two meters per second.

10. An apparatus for forming containers with imprinted motifs from thermoplastic sheet material, comprising:
    guide means defining a path for a ribbon of thermoplastic sheet material, said ribbon having a succession of predistorted motifs being imprinted thereon;
    feed means for advancing said ribbon along said path;
    a die alongside said path conforming to the shape of a container to be produced, said die having a mouth open toward said path and being provided with cooling means for chilling the surface thereof;
    a punch confronting said die across said path, said punch being receivable in said die and being provided with at least one resiliently loaded member having an extremity normally projecting from a free end of said punch toward said die, said extremity being narrower than said free end and entirely receivable therein;
    hearing means positioned to thermally soften a portion of said ribbon registering with said mouth and including a predistorted motif on a limited area thereof;
    actuating means for inserting said punch into said die with interposition of the thermally softened ribbon portion to deform same into the shape of the die, and with stretching by said extremity of said area to normalize the predistorted motif thereon prior to contact thereof with the chilled die surface, said die having a closed end repressing the projecting extremity of said member into said punch upon complete insertion of the punch into the die; and
    control means coupled to said feed means for intermittently arresting said ribbon preparatorily to operation of said actuating means.

11. An apparatus as defined in claim 10 wherein said punch has a body tapered toward said die, said body being provided near said free end with a peripheral edge thermally insulated from the remainder of said body.

12. An apparatus as defined in claim 10 wherein said control means includes sensing means upstream of said die responsive to markings longitudinally spaced along said ribbon in conformity with the positions of said predistorted motifs.

13. An apparatus as defined in claim 10 wherein said sensing means comprises a photoelectric cell.

14. An apparatus as defined in claim 10 wherein said heating means is disposed upstream of said die.

15. An apparatus as defined in claim 14 wherein said heating means comprises a pair of relatively reciprocable jaws operable in timed relationship with said actuating means for clamping an upstream portion of said ribbon between them to heat same concurrently with the deformation of a previously heated downstream portion between said punch and said die.

16. An apparatus as defined in claim 15 wherein said jaws have effective areas substantially of the same size as the area of said mouth.

17. An apparatus as defined in claim 10 wherein said feed means comprises a pair of coacting drive rollers upstream of said die temporarily disengageable from said ribbon by said control means.

18. An apparatus as defined in claim 19, further comprising brake means engageable with said ribbon upstream of said die, said brake means being coupled with said control means for operation concurrently with the disengagement of said drive rollers from said ribbon.

19. An apparatus as defined in claim 18 wherein said control means includes a triangular lever having one of said drive rollers mounted at a corner thereof, said brake means including a brake shoe mounted at another corner of said lever.

20. An apparatus as defined in claim 17 wherein said feed means further comprises a pair of coacting tension rollers downstream of said die for maintaining said ribbon stretched across said mouth.

* * * * *